United States Patent [19]

Bevilacqua et al.

[11] 4,239,596
[45] Dec. 16, 1980

[54] PASSIVE RESIDUAL HEAT REMOVAL SYSTEM FOR NUCLEAR POWER PLANT

[75] Inventors: Frank Bevilacqua, Windsor; Vincent M. Callaghan, West Granby, both of Conn.; James L. Van Fleet, Tokyo, Japan

[73] Assignee: Combustion Engineering, Inc., Windsor, Conn.

[21] Appl. No.: 861,229

[22] Filed: Dec. 16, 1977

[51] Int. Cl.² ............................................. G21C 15/18
[52] U.S. Cl. ........................................ 176/37; 176/38; 176/65
[58] Field of Search ..................... 176/38, 37, 87, 65; 165/134, 132

[56] References Cited

U.S. PATENT DOCUMENTS

| 3,127,322 | 3/1964 | Dodd | 176/38 |
|---|---|---|---|
| 3,290,222 | 12/1966 | Schoessow | 176/65 |
| 3,718,539 | 2/1973 | West | 176/37 |

FOREIGN PATENT DOCUMENTS 887252  1/1962  United Kingdom ...................... 176/38

*Primary Examiner*—Samuel W. Engle
*Assistant Examiner*—Edward F. Miles
*Attorney, Agent, or Firm*—Lombro J. Ristas

[57] ABSTRACT

An enclosed reservoir is sized and located in relation to the steam generator of a pressurized water nuclear reactor power plant so that upon a loss of feedwater flow to the steam generator, a gravity induced supplementary flow into the steam generator is automatically initiated to dissipate the residual heat generated in the reactor. The height of the reservoir is the same as the distance between upper and lower design limits on steam generator feedwater level. The top of the steam generator is fluidly connected to the top of the reservoir to equalize the pressure therebetween. The gravity induced flow from the reservoir to the steam generator produces a water level in the steam generator that stays within the upper and lower design limits.

9 Claims, 1 Drawing Figure

PASSIVE RESIDUAL HEAT REMOVAL SYSTEM FOR NUCLEAR POWER PLANT

BACKGROUND OF THE INVENTION

Increasing concern over the reliability and availability of nuclear reactor residual heat removal systems has been voiced by government regulatory agencies and industry standards committees. Although nuclear reactors can be shut down in the event of an abnormal incident with a high degree of reliability, the fuel continues to produce residual heat that can cause fuel meltdown if adequate cooling is not available. In current pressurized water reactor (PWR) designs, residual heat removal is accomplished by dumping steam from the steam generators and by supplying makeup feedwater to the steam generators through auxiliary feedwater systems. These auxiliary systems are complex, requiring the proper functioning of such active components as pumps, valves, instrumentation and controls, diesel generators, and switch gear. Another reason for the complexity of current residual heat removal systems is that they have commercial functions in addition to their safety-related functions. For example, such systems have complex control systems to accommodate plant depressurization and cooldown such as occurs prior to refueling. The equipment associated with current residual heat removal is located in diverse areas of the power plant, and the makeup water is stored in tanks outside the reactor containment building. The complexity and accessibility of major parts in current systems raises concerns over reliability and vulnerability to sabotage.

SUMMARY OF THE INVENTION

It is an object of the present invention to maintain for several hours a sufficient water inventory in the steam generator to absorb and dissipate the residual heat in a shutdown reactor, in the event that the normal feedwater supply is unavailable or has been consumed.

It is a further object to perform this duty with a totally passive system that is self-initiated on loss of feedwater flow and that continues to operate without operator intervention or instrument signals.

It is an additional object that the water level in the steam generator during the entire heat removal process not fall below or rise above the design level limits.

Accordingly, the present invention modifies existing PWR nuclear steam supply system designs by replacing the emergency feedwater tank and associated active components with an enclosed reservoir located at an elevation at least that of the steam generator lower water level design limit. The reservoir has a height equal to the difference in elevation of the steam generator upper and lower water level design limits and is preferably located within the containment building. Gravity operated means supplies water from the reservoir to the secondary side of the steam generator upon a loss of flow in the feedwater line, whereby the steam generator water level is maintained within the design limits during the entire heat dissipation process.

The present invention is a highly reliable, fully automated, failsafe, and protected system. The need for emergency power and switch gear for active feedwater pumps has been eliminated by using gravity feed to deliver supplementary feedwater to the steam generator. Active feedwater controls have been eliminated by choosing the geometry and location of the reservoir so that whether the water level in the reservoir is at the maximum or minimum, the design limits on steam generator feedwater level are not violated. The reservoir and associated equipment are preferably located inside the containment to minimize piping and enhance protection against external damage.

DESCRIPTION OF THE PREFERRED EMBODIMENT

Figure 1:
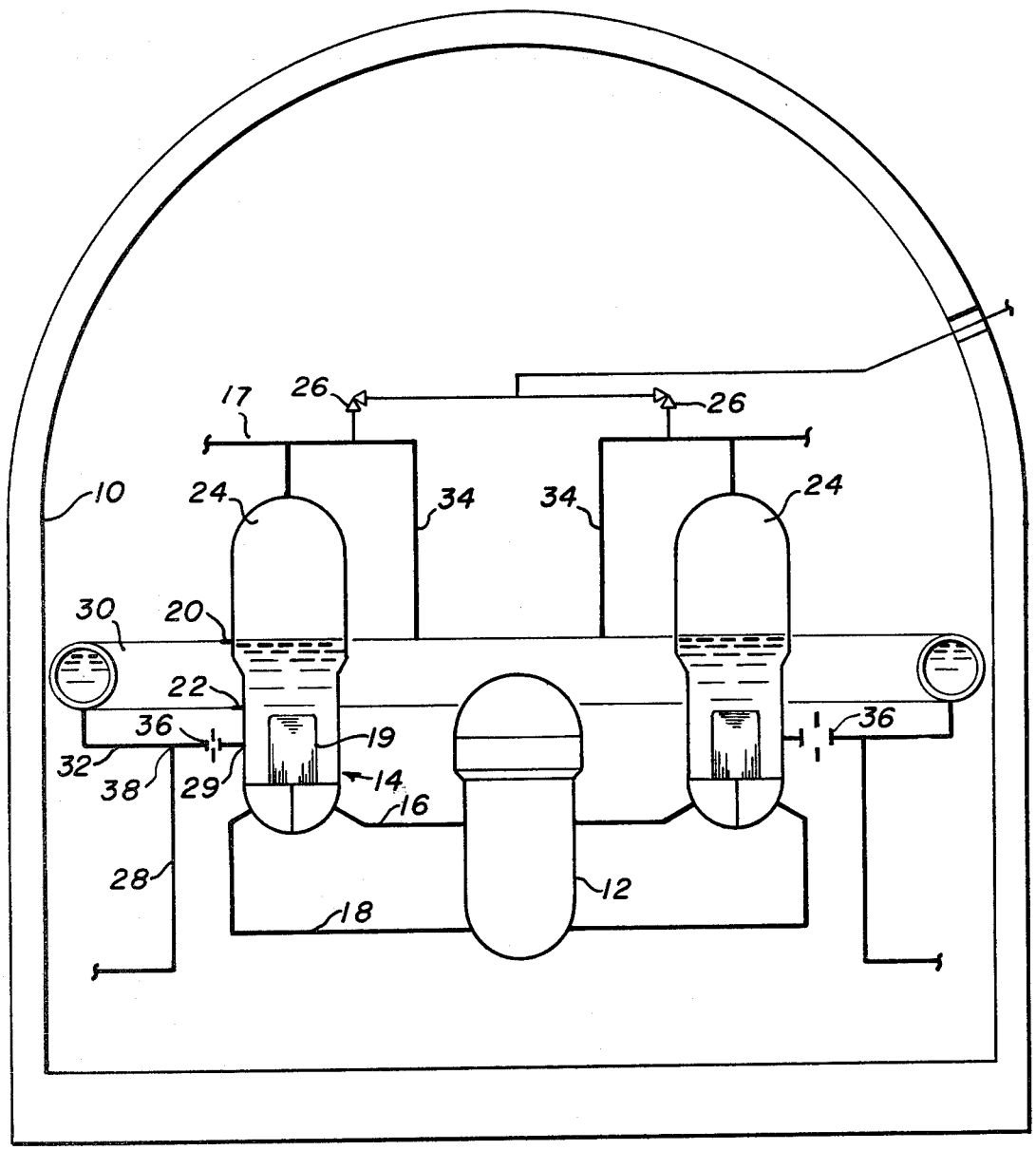
FIG. 1 is a schematic elevation view of a PWR nuclear steam supply system showing the preferred embodiment of the invention.

FIG. 1 shows a reactor containment building 10 within which is located the nuclear steam supply system. Heat is produced in the pressurized water reactor 12 and is transferred to the primary loop water, which then circulates through the reactor hot leg 16 and into the steam generator 14 where it loses some of its heat, and returns through the reactor cold leg 18 to be reintroduced into the reactor 12. In the steam generator 14 the primary coolant passes through steam generator tubes 19 which are immersed in a volume of secondary water. This water level is administratively controlled to specifications during normal operation to within a few inches of nominal, and should be maintained, even during unexpected transients or accidents, between upper design limit 20 and lower design limit 22, a distance typically about four feet. As this secondary water is heated, steam is produced and accumulates in the steam generator dome 24 before being transported through line 17 to the turbine-generator (not shown) where electricity is produced. Feedwater line 28 provides a steady supply of water through feedwater nozzle 29 to the steam generator 14 for making steam. In the event that the steam pressure in the dome 24 exceeds a predetermined maximum limit, the safety valve 26 will open to relieve the pressure and expel steam outside the containment into the atmosphere.

In the preferred embodiment, the present invention provides a reservoir 30 of water in a large toroid which can be readily supported by the containment walls 10. A toroidal shape provides high pressure containment capability relative to other shapes. The enclosed diameter of the toroid 30 is equal to the distance between upper and lower design limits 20, 22 of the steam generator, and the toroid is preferably located in register with those limits. The lower the elevation of the toroid, the more favorable is the seismic responses of the containment building. A gravity supply line 32 connects the lower level of the reservoir 30 to the secondary side of the steam generator 14, preferably through the same feedwater nozzle 29 as is used in connection with the normal feedwater line 28. The top of the reservoir 30 is connected to the steam generator dome 24 with pressure equalizing line 34. In this embodiment, a calibrated hydraulic resistance such as a flow orifice 36 is interposed between the feedwater line 28 and the feedwater nozzle 29.

During normal plant operation the nominal water level in the steam generator 14 is held essentially constant near the upper design limit 20 by controlling feedwater flow into the steam generator through feedwater line 28 and nozzle 29. At point 38 in FIG. 1, the pressure drop from the feedwater line 28 through the nozzle 29, the secondary water in the steam generator 14, and the pressure in the dome 24 are balanced against the static head of water that may exist in the portion of the pressure equalizing line 34 near its connection to the reservoir 30, the water in the reservoir, and the head in the gravity supply line 32. The orifice 36 is calibrated so that during full power plant operation the back pressure component in line 32 due to feedwater flow in line 28 against the orifice 36 is large enough to raise a few feet of water into the pressure equalizing line 34. At the low feedwater flow rates accompanying low power operation, there will be little, if any, water in line 34, but the reservoir 30 will be essentially full. As long as the plant is operated according to specifications, the elevation of the steam generator water level during normal operation will be close to the upper limit 20, and the reservoir water level will be close to the top of the reservoir 30, or in the equalizing line 34. Any temporary fluctuations in the steam generator water level will not significantly change the reservoir water level because the maximum gravity-induced flow rate from the reservoir 30 to the steam generator 14 is limited by the relatively small size of the gravity feed supply line 32. The line 32 is typically sized so that, with an effective water level difference of about one foot between the reservoir 30 and the steam generator 14, and in the absence of normal feedwater flow in line 28, only about 2 percent of the feedwater flow rate needed for full power steam production will flow through line 32 into the steam generator 14. In addition, when there is water in the equalizing line 34, elevation fluctuations in the steam generator 14 produce level changes in the line 34 but result in a negligible fluid transfer because of the very small water volume of the line 34 relative to the reservoir 30 or steam generator 14. The reservoir water supply therefore does not significantly affect normal feedwater level control, but comes into operation when normal feedwater flow is lost, as described below.

In the event that an abnormal incident occurs for which residual heat removal is required and the operator does not respond by instituting auxiliary feed and manual steam dump, the present invention automatically will function. When the feedwater flow in line 28 is lost, there is a decrease in the back pressure on the supply line 32 at 38. Since the pressure at the top of the water levels in both the steam generator 14 and reservoir 30 is the same due to the pressure equalizing line 34, the resulting new balance in pressures along the feedwater lines 28 and 32 produces an immediate equalization of water levels. Heat transfer to the secondary side of the steam generator results from the natural circulation of coolant through the reactor 12, where residual heat is being generated. When the steam is heated to the saturation temperature associated with the set pressure on the safety valve 26, the valve automatically lifts. Steam leaving the steam generator through the safety valve 26 provides residual heat removal but also depletes the steam generator water inventory. Gravity feed through supply line 32 keeps the steam generator water level between the upper and lower design limits 20, 22. It is particularly desirable to maintain the water in the steam generator above the lower operating limit 22 in order to avoid uncovering the steam generator tubes 19. As the reservoir 30 is depleted, the water level in the steam generator will fall, but will never drop below the lower operating limit 22 unless the reservoir 30 has been fully drained and heat continues to be generated in the nuclear reactor 12. It is highly unlikely that the reservoir will be fully drained, however, since a toroidal embodiment such as is shown in FIG. 1 can easily supply 8 or more hours of cooling capability (170,000 Gal.) for a 4000 MWTh plant. This is ample time to regain normal feedwater operation.

After normal feedwater capability is regained and normal flow resumed through line 28, the reservoir 30 and steam generator 14 will automatically refill in parallel at approximately the same rate. The orifice 36 offers little flow resistance during refilling unless the feedwater flow approaches the full power rate, at which point some water will be a few feet higher in the reservoir 30 or pressure equalizing line 34 than in the steam generator 14. When the water level in the steam generator 14 returns to its nominal elevation, the reservoir 30 will be full. The use of the feedwater line 28 to refill and support the water in the reservoir 30 is intended to assure that during normal operation the water level in the reservoir 30 is at least as high as the steam generator water level. The calibrated flow orifice 36 facilitates this result but other arrangements can be used without departing from the scope of the invention. For example, the hydraulic resistance 36 can be variable to maintain, during normal operation, a constant water level in the reservoir 30 or equalizing line 34 even when the feedwater flow rate is decreased for low power operation or the steam generator water level cannot be maintained near the nominal valve.

What is claimed is:

1. In a nuclear steam supply power plant having a pressurized water reactor in fluid communication with the primary tube side of a steam generator, the secondary shell side of which has a steam volume above a water volume, the water volume having upper and lower design level limits, the plant further including a normal feedwater supply line to the secondary side of the steam generator and a safety valve connected to the secondary side of the steam generator, a system for passively dissipating the residual heat of the reactor after a shutdown, comprising:
   an enclosed reservoir located at an elevation at least that of the lower level limit and having a height substantially equal to the difference in elevation between the upper and lower level limits and having a predetermined volume chosen according to the amount of residual energy desired to be dissipated; and
   means for passively and automatically supplying water under the force of gravity from said reservoir to the secondary side of the steam generator upon a loss of flow in the normal feedwater line, whereby the steam generator water level is maintained between the level limits so long as there is water in said reservoir.

2. The system of claim 1 wherein said means for supplying water comprises:
   conduit means fluidly connecting the minimum level of said reservoir to the steam generator; and
   means for providing pressure communication between the steam volume of the steam generator and said reservoir.

3. The system of claim 2 wherein said conduit means is connected to the feedwater line.

4. The system of claim 2 wherein said conduit means is connected to the normal feedwater line.

5. The system of claim 3 wherein said means for supplying water further comprises calibrated hydraulic resistance means located between said reservoir and the steam generator, said resistance means cooperating with the feedwater line to influence the water level in said reservoir relative to that in the steam generator, in response to the feedwater flow rate.

6. The system of claim 5 wherein said conduit means is sized such that in the absence of normal feedwater flow, and with an effective water level difference of about one foot between the reservoir and the steam generator, said conduit means will pass water to the steam generator at a rate less than 2 percent of the normal fuel power feedwater flow rate.

7. The system of claim 6 wherein said hydraulic resistance means consists of a flow orifice in said feedwater flow line between said conduit means and the steam generator.

8. The system of claim 7 wherein said flow orifice is selectively variable during normal plant operation.

9. The system of claim 7 wherein said means for providing pressure communication includes a stand pipe projecting upward from said reservoir, and said flow orifice is sized such that at a predetermined feed water flow rate, a water level higher than the upper level limit is supported in said stand pipe.

* * * * *